Patented Mar. 30, 1937

2,075,179

UNITED STATES PATENT OFFICE 2,075,179

RECOVERY OF CHLORATES BY SELECTIVE EXTRACTION WITH ACETONE

George Lewis Cunningham, Niagara Falls, N. Y., assignor to The Mathieson Alkali Works, Inc., New York, N. Y., a corporation of Virginia No Drawing. Application February 9, 1934, Serial No. 710,530

9 Claims. (Cl. 23—85)

My invention relates to improvements in the separation and recovery of the chlorates of magnesium, calcium, barium and strontium from mixtures including either or both the chlorides and the chlorites of these elements. I have discovered that these chlorates are, as compared to these chlorides and chlorites, selectively soluble in acetone to an extent sufficient to enable the separation and recovery of the chlorates in high concentration from mixtures including either or both the chlorides and the chlorites by extraction with acetone.

In one aspect, my invention makes available for the production of chlorates the conventional reactions between chlorine and the oxides and hydroxides of magnesium and the alkaline earth metals producing mixtures of chlorides and chlorates. In another aspect, my invention makes available for the production of chlorites as well as chlorates the conventional reactions between chlorine dioxide and the oxides and hydroxides of magnesium and the alkaline earth metals producing mixtures of chlorates and chlorites.

My invention is of special value and application in the separation of mixtures consisting essentially of chlorates and chlorites of magnesium, calcium, barium and strontium in that, because of the substantially complete separation possible, chlorites of high purity and chlorates of high purity can thus be produced directly.

For example, to produce chlorites and chlorates of one or more of the elements, magnesium, calcium, barium and strontium, oxides or hydroxides of one or more of these elements may be caused to react with chlorine dioxide to form a mixture consisting essentially of approximately equal molecular proportions of chlorates and chlorites. If this reaction is carried out in the presence of water, and if the molecular ratio of water present to the mixed chlorites and chlorates on completion of the reaction exceeds about 6:1, the resulting solution or slurry is best concentrated by evaporation until this ratio has been reduced to 6:1 or less. The resulting mixtures of chlorites and chlorates, either as dry or substantially dry solids or as a concentrated solution or slurry, may then be subjected to selective extraction with acetone, best substantially water-free or containing insufficient water to carry the molecular ratio of water present to the mixed chlorites and chlorates above about 6:1, to effect a substantially complete separation of chlorites and chlorates, the chlorates being dissolved in the acetone and the chlorites remaining as the extraction residue. The chlorates can be recovered from the acetone extract in any convenient manner, the separation preferably including recovery of the solvent acetone, for example by evaporation of the acetone. Separations of chlorites and chlorates of magnesium and the alkaline earth metals can be so carried to within 1% of completion.

The following example, relating more particularly to the separation of chlorites and chlorates, will assist the illustration of my invention:

*Example 1.*—Chlorine dioxide, in a mixture with air in which, at standard conditions, the partial pressure of the chlorine dioxide approximated 25–40 mm. of mercury, was passed through a suspension of 148 parts (by weight) of calcium oxide in approximately 750 parts of water until 270 parts of chlorine dioxide had been absorbed. Insoluble matter was separated from the resulting solution by filtration, and the filtered solution was reduced substantially to dryness by evaporation under subatmospheric pressure. The resulting mixture, consisting essentially of calcium chlorite and calcium chlorate, after being cooled to about 30° C., was subjected to three successive extractions, 400 parts of acetone being used in each extraction. About 174 parts of calcium chlorite were recovered as the extraction residue, this product analyzing 99.71% $Ca(ClO_2)_2$. About 232 parts of calcium chlorate were recovered by evaporation of the acetone from the combined extracts, this product analyzing 88.71% $Ca(ClO_3)_2$ and 11.28% $H_2O$.

Again, for example, to produce chlorates of one or more of the elements magnesium, calcium, barium and strontium, oxides or hydroxides of one or more of these elements may be chlorinated at elevated temperature in the presence of water to form a solution containing a mixture of chlorides and chlorates in molecular proportions of approximately 5:1. This solution is best concentrated by evaporation until the molecular ratio of water present to the mixed chlorides and chlorates approximates 4:1–6:1. The resulting mixtures of chlorides and chlorates, either as dry or substantially dry solids or as a concentrated solution or slurry, may then be subjected to selective extraction with acetone, best substantially water-free, to effect a separation of substantially all of the chlorates from the bulk of the chlorides, the chlorates being dissolved in the acetone and the chlorides remaining as the extraction residue. The chlorates can be recovered from the acetone extract in any convenient manner, the separation preferably including recovery of the solvent acetone, for example by evaporation of the acetone.

The following example, relating more particularly to the separation of chlorates and chlorides, will further assist the illustration of my invention:

Example 2.—Chlorine was passed through a slurry consisting of a suspension of 241.9 parts (by weight) of magnesium oxide in 1242 parts of water, while permitting the temperature to rise by absorption of the heat of reaction, until 426 parts of chlorine had been absorbed. The chlorinated slurry was boiled to convert all remaining hypochlorite to chloride and chlorate. The molecular ratio of $MgCl_2$ to $Mg(ClO_3)_2$ in the resulting liquor then approximated 5:1. This liquor was concentrated by evaporation of 616 parts of water and after being cooled to about 30° C., the resulting slurry was subjected to countercurrent extraction with 1000 parts of acetone. After evaporation of the acetone from the extract a slurry consisting of 191.2 parts magnesium chlorate, 47.7 parts of magnesium chloride and 140.5 parts of water was recovered. About 914.8 parts of $MgCl_2.6H_2O$ were recovered as the extraction residue.

The first of the foregoing examples illustrates application of the extraction to a mixture in the form of dry or substantially dry solids and the second illustrates application of the extraction to a concentrated solution or slurry.

The separation effected by the extraction is a separation of chlorates, on the one hand, from chlorides and/or chlorites, on the other hand, irrespective of the particular chlorate or chlorates or the particular chloride or chlorides and chloride or chlorites so involved. My invention is thus applicable to the separation of chlorates from mixtures including either or both the chlorides and the chlorites of any one or more of the elements magnesium, calcium, barium and strontium.

I claim:

1. In the recovery of chlorates of the metals of the class consisting of magnesium, calcium, barium and strontium from mixtures including a compound of the class consisting of chlorides and chlorites of the metals of the class consisting of magnesium, calcium, barium and strontium, the improvement which comprises selectively separating the chlorate from the mixture by extraction with acetone.

2. In the recovery of magnesium chlorate from mixtures including magnesium chloride, the improvement which comprises selectively separating the magnesium chlorate from the mixture by extraction with acetone.

3. In the recovery of chlorates of magnesium, calcium, barium and strontium from mixtures including chlorites of the same, the improvement which comprises selectively separating the chlorate from the mixture by extraction with acetone.

4. In the recovery of magnesium chlorate from mixtures including magnesium chlorite, the improvement which comprises selectively separating the magnesium chlorate from the mixture by extraction with acetone.

5. In the recovery of calcium chlorate from mixtures including calcium chlorite, the improvement which comprises selectively separating the calcium chlorate from the mixture by extraction with acetone.

6. In the separation of mixtures consisting essentially of chlorates and chlorites of magnesium, calcium, barium and strontium, the improvement which comprises selectively separating chlorates from chlorites by extraction with acetone.

7. In the separation of mixtures consisting essentially of magnesium chlorate and magnesium chlorite, the improvement which comprises selectively separating the magnesium chlorate from the magnesium chlorite by extraction with acetone.

8. In the separation of mixtures consisting essentially of calcium chlorate and calcium chlorite, the improvement which comprises selectively separating the calcium chlorate from the calcium chlorite by extraction with acetone.

9. In the recovery of magnesium chlorate from mixtures including a compound from the class consisting of magnesium chlorite and magnesium chloride, in the presence of water, the improvement which comprises selectively separating the chlorate from the mixture by extraction with acetone.

GEORGE LEWIS CUNNINGHAM.